United States Patent [19]

Holt

[11] 4,442,003
[45] Apr. 10, 1984

[54] FILTER ASSEMBLY
[75] Inventor: Earl R. Holt, Rochester, Mich.
[73] Assignee: Hose Specialties Company, Detroit, Mich.
[21] Appl. No.: 430,326
[22] Filed: Sep. 30, 1982
[51] Int. Cl.³ .................. B01D 27/08; B01D 35/02
[52] U.S. Cl. ............................. 210/445; 210/455; 210/451; 210/499
[58] Field of Search ............... 210/445, 451, 453, 454, 210/455, 460, 499; 118/300; D23/17; 222/189

[56] References Cited
U.S. PATENT DOCUMENTS

| | | | |
|---|---|---|---|
| 1,140,758 | 5/1915 | Miller | 210/445 |
| 1,971,120 | 8/1934 | Rice et al. | 210/445 |
| 2,068,837 | 1/1937 | Aronson | 210/445 |
| 2,375,646 | 5/1945 | Grossi | 210/445 |
| 2,421,329 | 5/1947 | Hoffer | 210/445 |
| 2,530,283 | 11/1950 | Brown | 210/445 |
| 2,658,625 | 11/1953 | Rafferty | 210/445 |
| 3,622,007 | 11/1971 | Pappathatos | 210/445 |
| 3,794,180 | 2/1974 | Blocker | 210/445 |
| 4,263,140 | 4/1981 | Wujnovich et al. | 210/445 |

Primary Examiner—Charles N. Hart
Assistant Examiner—Wanda L. Millard
Attorney, Agent, or Firm—Harness, Dickey & Pierce

[57] ABSTRACT

A compact inline filter assembly particularly adapted for use in a liquid paint supply system for removing foreign particulate matter at a point upstream from a manual or automatic spray nozzle. The filter assembly comprises an integral tubular body member provided with female and male threaded connections at the ends thereof and a replaceable filter element comprising a tapered ferrule and an integral fine mesh screen removably seated within the body member and clamped in axially centered relationship by a threaded male connection engaged with the body member.

6 Claims, 5 Drawing Figures

U.S. Patent    Apr. 10, 1984    4,442,003
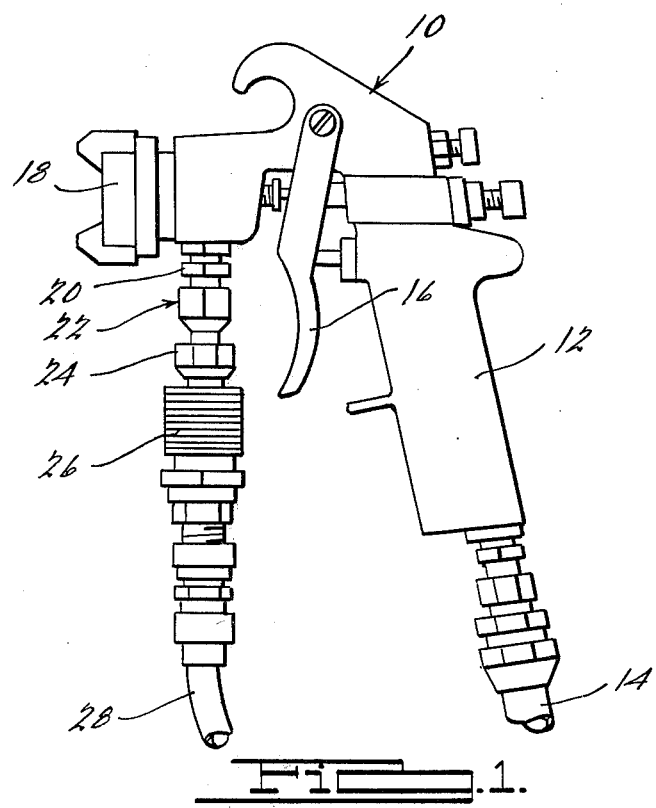
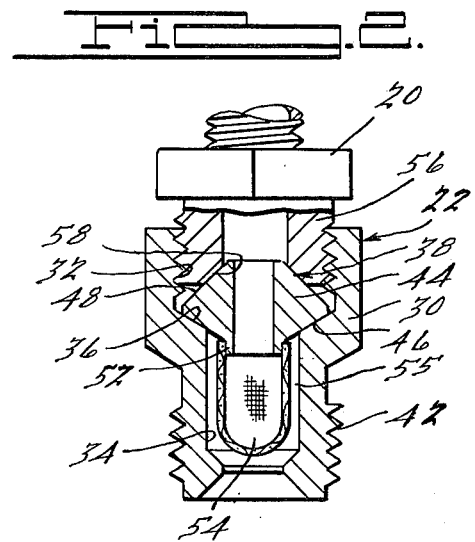
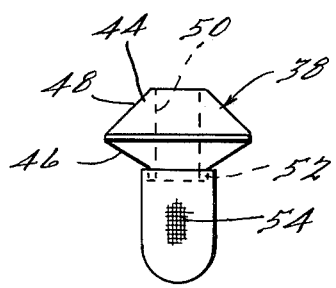
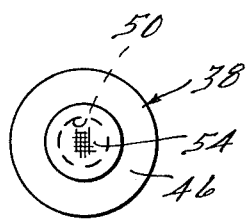
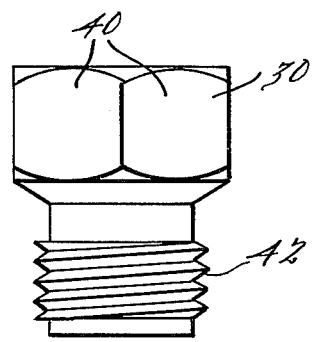

FILTER ASSEMBLY

BACKGROUND OF THE INVENTION

A continuing problem associated with the spray application of liquid paints is the presence of foreign particulate matter in the liquid paint supply which causes imperfections on the surfaces of an article being spray painted frequently necessitating a refinishing and repainting thereof. Such foreign particulate matter sometimes referred to as "seeds", or "strings", or "slugs" are formed in many instances as a result of an agglomeration of the paint constituents during standing or recirculation of the liquid paint necessitating removal prior to discharge through the spray nozzle. The foregoing problem is particularly pronounced in recirculating-type liquid paint systems which are in widespread commercial use for keeping heavily-bodied pigments uniformly suspended in the liquid paint thereby assuring uniformity in the color and quality of the paint film applied to an article being painted. Such recirculating paint systems usually comprise a mixing tank equipped with suitable agitation for maintaining the paint uniformly mixed and a pump for transferring the liquid paint under a desired pressure to an automatic or manual spray nozzle in an amount in excess of that required which is returned through a suitable return conduit to the mixing tank. In spite of the provision of suitable filters in the recirculating supply line, the accumulation of foreign particulate matter occurs resulting in objectionable spray patterns.

The foregoing problem is also encountered during the spray application of paints supplied from a suction tank or cup directly connected to the spray gun. In recognition of this problem, a variety of filter devices have heretofore been proposed or used in liquid paint supply systems which are adapted to be connected at a point in close proximity to the spray nozzle effecting a final filtration just prior to entry of the spray assembly. Prior art filter assemblies of the types heretofore known are generally characterized by their relatively large size and associated weight, by their multiple component construction increasing the complexity and cost of the assembly as well as difficulty during cleaning and replacement of the filter cartridges, and their relatively large volume requiring increased time to effect a purging of the internal volume thereof such as occasioned when changing paint colors in a multiple-color recirculating paint supply system. Such prior art filter assemblies because of their size and weight have not received widespread commercial acceptance in hand-held paint spray systems due to the awkwardness of the resulting assembly.

The present invention overcomes many of the problems and disadvantages associated with prior art filter assemblies by providing a compact, simple, lightweight and highly efficient inline filter assembly which is versatile in use and can be installed at any one of a variety of locations in a liquid paint supply system. The compact and simple construction of the filter assembly enables attachment directly to a hand-held spray gun without materially increasing the weight of the assembly as well as to automatic spray equipment. The simplicity and efficiency of the filter assembly facilitates periodic cleaning of the filtering element thereof and provides for a low cost simple and efficient assembly.

SUMMARY OF THE INVENTION

The benefits and advantages of the present invention are achieved by an inline filter assembly which comprises an integral tubular body member formed with a through-bore having an annular tapered shoulder intermediate of the upstream and downstream ends thereof. The downstream end of the body member is formed with an internal thread extending inwardly of the bore toward the tapered shoulder for threadably receiving a male connection formed with a conically tapered seat adjacent to the end thereof. A removable filter element is disposed within the body member and comprises an annular ferrule formed with a first annular conical seat adapted to be disposed in seated relationship on the tapered shoulder within the body member and a second annular conical seat adapted to be disposed in seated relationship on the conically tapered seat of the male connection to which the body member is attached. A thimble-shaped filter screen of an integral construction is affixed to the ferrule adjacent to the first conical seat and projects axially within the bore toward the upstream end thereof for receiving and filtering a supply of liquid paint entering the upstream end of the body member. The upstream end portion of the filter assembly is provided with suitable connecting means such as an external thread for removably connecting the filter assembly to a paint supply system.

Additional benefits and advantages of the present invention will become apparent upon a reading of the Description of the Preferred Embodiments taken in conjunction with the accompanying drawing.

BRIEF DESCRIPTION OF THE DRAWING

FIG. 1 is a side elevational view, partly schematic, of a typical air atomizing type spray gun incorporating a filter assembly of the present invention connected through a quick-disconnect connection to a pressurized liquid paint supply system;

FIG. 2 is an enlarged transverse sectional view of the filter assembly connected to the inlet of the spray gun as shown in FIG. 1;

FIG. 3 is a side elevational view of the removable filter element of the filter assembly shown in FIG. 2;

FIG. 4 is an end view of the filter element as shown in FIG. 3; and

FIG. 5 is a side elevational view of the tubular body member of the filter assembly.

DESCRIPTION OF THE PREFERRED EMBODIMENTS

Referring now in detail to the drawings, and as may be best seen in FIG. 1, a spray gun 10 of the conventional air atomization type is shown including a hand grip 12 having the butt end thereof connected to an air hose 14 for supplying pressurized atomizing air to the spray nozzle. The spray gun is further provided with a pivotally mounted trigger 16 for controlling the discharge of an air atomized spray of paint from a mixing nozzle 18 at the forward end thereof. The internal structural arrangements of the spray gun 10 can be of any of the types well-known and commercially available including airless type spray equipment as well as manual and automatic spray equipment.

In the specific arrangement as illustrated in FIG. 1, a supply of pressurized liquid paint enters the gun through a threaded coupling 20 which in turn is secured to the filter assembly 22 of the present invention which in turn is connected to a coupling 24 having a quick-disconnect stem secured thereto and removably engaged by a quick-disconnect fitting 26 connected to a flexible paint supply tube 28. This arrangement is typical of a recirculating paint flow control system which advantageously can further incorporate a flow control device of the general type as described in U.S. Pat. No. 4,106,699. While only one filter assembly 22 is employed in the arrangement of FIG. 1, a second filter assembly can advantageously be employed in the paint supply line located at the inlet side of the quick-disconnect coupling 26 to provide an initial filtering action followed by a final filtering action by the assembly 22. This latter arrangement is particularly desirable in a multiple color paint supply system whereby the spray gun 10 is disconnected from one color paint supply source and connected to a second pressurized paint supply source having a different color paint. Under such circumstances, it will be appreciated that the internal volume of the inline filter assembly 22 is important in minimizing purging of the prior paint color thereby saving time and also reducing wastage of paint prior to resumption of the painting operation.

It is also contemplated that in lieu of a remote supply of pressurized liquid paint, the filter assembly 22 can be interposed in the position as shown between a conventional suction-type paint cup directly connected to the spray gun and portable therewith as in the case of paint applications involving smaller areas such in automobile body repair centers.

Referring now to FIGS. 2–5 of the drawing, the filter assembly 22 comprises an integral tubular body member 30 formed with a threaded counter-bore 32 in the downstream section thereof disposed in communication with a smooth bore 34 in the upstream section thereof and defining at their intersection an annular tapered shoulder 36 against which a filter element 38 is adapted to be removably seated and in axial alignment relative to the bore 34. The downstream end of the body member 30 is preferably provided with flats 40 disposed in a hexagonal arrangement as shown in FIG. 5 for engagement by a wrench. The upstream section of the body member 30 is preferably provided with an external threaded section 42 for attachment of the filter assembly to the paint supply conduit such as the quick-disconnect coupling 24 as shown in FIG. 1.

The filter element 38 as best seen in FIGS. 2–4 comprises a tubular annular ferrule 44 formed with a first annular conical seat 46 and a second annular conical seat 48. The first conical seat 46 is preferably oriented at an angle of about 30 degrees from a plane disposed perpendicular to the axis of the filter element whereas the second conical seat 48 is preferably disposed at an angle of about 45 degrees from a plane perpendicular to the axis of the filter element and consistent with conventional tapers on tube fittings in accordance with national standards. The ferrule 44 is provided with an axially extending through-bore 50 and a tubular projection 52 extending axially of the first conical seat 46. An integral thimble-shaped filter screen 54 is disposed with the downstream end thereof in overlying supported relationship around the tubular projection 52 and is suitably affixed thereto such as by brazing or welding. The filter screen 54 in accordance with the arrangement illustrated in FIGS. 2 and 3 comprises a circular cylindrical section integrally connected to a substantially hemispherical end section which is disposed in the path of the incoming liquid paint providing for a self-cleaning action with the particulate matter moving axially along the annular space indicated at 55 in FIG. 2 toward the ferrule of the filter element. The periphery of the cylindrical section of the filter screen is preferably spaced inwardly of the surface of the smooth bore 34 a distance of about 0.050 inch providing a volume for collection of the foreign particulate matter in the paint.

The body member 30, the ferrule 44 and the filter screen 54 are preferably composed of a corrosion resistant metal such as stainless steel, for example, and the filter screen itself may be of about 100 to about 160 mesh size depending on the filtering characteristics desired.

In the assembled condition as illustrated in FIG. 2, the first conical seat 46 is disposed in seated relationship against the tapered shoulder 36 of the body member which effects a centering of the filter element and a sealing of the ferrule to the body member avoiding any paint bypass. The clamped relationship of the filter element within the body member is achieved by the coaction of a threaded male member 56 such as on the coupling 20 formed with a conically tapered seat 58 at the end thereof which is adapted to seatably engage the second conical seat of the ferrule retaining the filter element in clamped relationship therebetween.

The simplicity and compact nature of the filter assembly as hereinabove described and as illustrated in the drawing, provides for wide latitude and versatility in the installation thereof at one or more locations in a liquid paint supply system. Additionally, a cleaning of the filter screen of the filter assembly can readily be achieved by simply disconnecting the tubular body member from the adjacent coupling enabling a removal of the filter element and a cleaning or replacement thereof as may be desired or required. Operation down time is thereby minimized.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. An inline filter assembly adapted for use in a paint spray supply system comprising an integral tubular body member formed with a throughbore having an annular tapered shoulder intermediate the upstream and downstream ends thereof, said body member formed with an internal thread in the downstream portion of said bore extending inwardly toward said tapered shoulder for threadably receiving a threaded male connection formed with a conically tapered seat at the end thereof, a removable filter element comprising an annular ferrule formed with a first annular conical sealing seat disposed in seated sealing relationship on said tapered shoulder and a second annular conical sealing seat disposed in seated sealing relationship on the conically tapered seat of the male connection and removably clamped therebetween, a thimble-shaped filter screen affixed to said ferrule adjacent to said first conical seat and projecting axially within said bore toward said upstream end, and means on the upstream end portion of said body member for connecting said filter assembly to a paint supply system.

2. The filter assembly as defined in claim 1 wherein said tapered shoulder and said first annular conical seat are disposed at an angle of about 30 degrees from a plane perpendicular to the axes thereof.

3. The filter assembly as defined in claim 1 wherein said second annular conical seat is disposed at an angle of about 45 degrees from a plane perpendicular to the axis thereof.

4. The filter assembly as defined in claim 1 in which said ferrule further includes a tubular projection extending axially of said first annular conical seat for supporting said filter screen in overlying relationship therearound.

5. The filter assembly as defined in claim 1 in which said filter screen is of an integral wire mesh including a circular cylindrical portion integrally connected at its upstream end to a substantially hemispherical section.

6. The filter assembly as defined in claim 4 further including bonding means for securing said filter screen to said tubular projection.

* * * * *